United States Patent
Shapiro et al.

(10) Patent No.: US 10,783,644 B2
(45) Date of Patent: Sep. 22, 2020

(54) METHODS AND SYSTEMS FOR ALGORITHMICALLY ANALYZING URBAN FORM

(71) Applicant: Topos Inc., Brooklyn, NY (US)

(72) Inventors: Will Shapiro, New York, NY (US); Mahir Yavuz, Brooklyn, NY (US)

(73) Assignee: Topos Inc., Brooklyn, NY (US)

( * ) Notice: Subject to any disclaimer, the term of this patent is extended or adjusted under 35 U.S.C. 154(b) by 77 days.

(21) Appl. No.: 16/256,921

(22) Filed: Jan. 24, 2019

(65) Prior Publication Data

US 2019/0244361 A1 Aug. 8, 2019

Related U.S. Application Data

(60) Provisional application No. 62/627,595, filed on Feb. 7, 2018.

(51) Int. Cl.
| | |
|---|---|
| *G06T 7/13* | (2017.01) |
| *G06K 9/00* | (2006.01) |
| *G06T 7/00* | (2017.01) |
| *G06K 9/46* | (2006.01) |

(52) U.S. Cl.
CPC ............ *G06T 7/13* (2017.01); *G06K 9/00476* (2013.01); *G06K 9/00637* (2013.01); *G06K 9/4609* (2013.01); *G06T 7/0002* (2013.01); *G06T 2207/20164* (2013.01)

(58) Field of Classification Search
CPC ................... G06T 7/13; G06T 7/0002; G06T 2207/20164; G06K 9/4609; G06K 9/00476; G06K 9/00637
USPC ........................................................ 382/173
See application file for complete search history.

(56) References Cited

U.S. PATENT DOCUMENTS

2019/0147116 A1* 5/2019 Benjamin ............ G06Q 50/165
703/1

* cited by examiner

*Primary Examiner* — Amandeep Saini
(74) *Attorney, Agent, or Firm* — Wolf, Greenfield & Sacks, P.C.

(57) ABSTRACT

According to some aspects, a system is provided comprising at least one computer hardware processor and at least one non-transitory computer-readable storage medium storing processor-executable instructions that, when executed by the computer hardware processor, cause the computer hardware processor to perform obtaining an image of a map relating to a geographical area, identifying, using at least one automated image processing technique, a set of angles associated with a set of edges in the image, determining, based on the set of angles, at least one of a measure of angular complexity, a measure of angular entropy, and a measure of griddedness for the image, and indicating an urban form of the geographical area based on at least one of the determined measure of angular complexity, the determined measure of angular entropy, and the determined measure of griddedness of the image.

20 Claims, 6 Drawing Sheets

METHODS AND SYSTEMS FOR ALGORITHMICALLY ANALYZING URBAN FORM

CROSS REFERENCE TO RELATED APPLICATIONS

This application claims priority under 35 U.S.C. § 119(e) to U.S. Provisional Patent Application Ser. No. 62/627,595, entitled "METHODS AND SYSTEMS FOR ALGORITHMICALLY ANALYZING URBAN FORM," filed on Feb. 7, 2018, which is herein incorporated by reference in its entirety.

BACKGROUND

The urban form of a neighborhood or a part of a city may affect a resident's or a visitor's experience when they are present in that neighborhood or part of the city, such as physical patterns, layouts, and/or structures that make up the neighborhood. For example, the griddedness of a neighborhood may impact how easy or difficult it is for people to navigate the neighborhood. As another example, the presence of multiple highways in a neighborhood may affect a potential resident's decision to move into an apartment in the neighborhood. As another example, the transit line density of a neighborhood may affect a co-working company's decision regarding whether to lease a space in the neighborhood for its next venture.

SUMMARY

In some embodiments, a system is provided for algorithmically analyzing the form of cities and neighborhoods using artificial intelligence and computer vision techniques. The system operates by applying image processing techniques to an image of a map for a geographical area to identify a set of angles associated with a set of edges in the image. From these angles, the system determines measures indicative of urban form including such measures as angular complexity, angular entropy, and griddedness. The results of this analysis may be provided to others by displaying them in a user interface, through an application programming interface, or another suitable medium. For example, the analysis results generated by this system may enable users and other systems to distinguish the complex, labyrinthine layout of certain cities and neighborhoods from cities and neighborhoods that are orthogonally gridded. In another example, the analysis results may distinguish sparse rural areas from dense urban centers. In yet another example, the analysis results may give an indication of how easy an area is to navigate using particular modes of transport (e.g., walking, biking, public transportation, etc.). Such analysis may be used for several different purposes including, but not limited to, recommending specific hotels or apartments for people looking to move or travel to a given city or neighborhood, guiding commercial and residential real estate development and investment, informing scaling strategy for companies and restaurant groups that require brick and mortar locations, and empowering recommendation for location based services and technologies including mobile phone applications, augmented reality applications, and autonomous vehicles.

In some embodiments, the described urban form analysis may be applied to predictive machine learning models. The metrics produced by the described urban form analysis may power one or more predictive machine learning models for a variety of applications, e.g., for retail, commercial and residential real estate companies. For example, a co-working company, such as WEWORK, BREATHER, KNOTEL, CBRE HANA, etc., may conventionally evaluate new spaces to lease or buy based purely on intuition and local real estate expertise. The described urban form measures, describing various different qualities of the city, may provide a powerful, data-driven automated approach to identifying new opportunities. By ingesting occupancy data or other success metrics/key performance indicators (KPIs) from a co-working company, predictive machine learning models, such as regression and classification models, may be trained to predict what new cities and neighborhoods may be the most successful new opportunities for a given company. One particularly appealing aspect of such an urban form analysis may be that it is globally scalable. Unlike other data sources, such as census information or user data from user-facing applications that only are available in a few countries, map data is available across the globe. This means that these features may be scaled out across the globe, and allow for predictions in any country. This may be particularly relevant to rapidly scaling companies with global ambitions, as it is often hugely time-consuming to assemble good real estate teams to do sourcing.

In some embodiments, the described urban form analysis may be applied to real estate and travel applications. Understanding the form of a neighborhood can be a powerful aid for travelers or people looking to move to a new neighborhood. For a traveler, going to a part of the city that is easily navigable and gridded, rather than labyrinthine, can often be desirable, particularly if that traveler has never been to the city before or does not understand the language of street signs. The griddedness and angular complexity analysis may be used to algorithmically rank and recommend neighborhoods and even specific hotels based on how easy it is to navigate the surrounding area. For someone looking to buy or rent an apartment, understanding how much parkland is in a given neighborhood, or whether highways are a big part of a neighborhood may be deciding factors in choosing the right apartment. The density-based analyses described below can be used to algorithmically rank or recommend neighborhoods and even specific apartments based on the density of different urban systems (e.g., parks, highways, subways, etc.) in the surrounding area. In turn, this analysis may reveal desirable neighborhoods that the person did not consider which may be advantageous from a cost saving perspective, or for purposes of arbitrage.

According to some aspects, a system is provided comprising at least one computer hardware processor and at least one non-transitory computer-readable storage medium storing processor-executable instructions that, when executed by the at least one computer hardware processor, cause the at least one computer hardware processor to perform obtaining an image of a map relating to a geographical area, identifying, using at least one automated image processing technique, a set of angles associated with a set of edges in the image, determining, based on the set of angles, at least one of a measure of angular complexity, a measure of angular entropy, and a measure of griddedness for the image, and indicating an urban form of the geographical area based on at least one of the determined measure of angular complexity, the determined measure of angular entropy, and the determined measure of griddedness of the image.

According to some embodiments, the identifying comprises detecting the set of edges in the image and identifying the set of angles using the detected set of edges. According to some embodiments, the detecting is performed using an edge detection algorithm including one or more of a Canny edge detection algorithm, a Deriche edge detection algorithm, a Differential edge detection algorithm, a Sobel edge detection algorithm, a Prewitt edge detection algorithm, and a Roberts cross edge detection algorithm.

According to some embodiments, the processor-executable instructions further cause the at least one computer hardware processor to perform rounding respective numerical values of the one or more angles based on a specified rounding threshold.

According to some embodiments, the processor-executable instructions further cause the at least one computer hardware processor to perform analyzing, on a pixel-by-pixel basis, the image to determine a density of pixels represented in the image.

According to some embodiments, the processor-executable instructions further cause the at least one computer hardware processor to perform determining a percentage of the image that is outside of the geographical area under analysis for urban form.

According to some embodiments, the processor-executable instructions further cause the at least one computer hardware processor to perform normalizing the image to produce a normalized image based on at least one of a uniform format, a uniform zoom level, a uniform set of colors, and an urban form represented in the at least one map.

According to some embodiments, the determining comprises determining a total number of unique angles present in the one or more angles to calculate the measure of angular complexity.

According to some embodiments, the determining comprises determining a distribution of unique angles present in the one or more angles to calculate the measure of angular entropy.

According to some embodiments, the determining comprises determining a frequency of orthogonal angles present in the one or more angles to calculate the measure of griddedness, wherein the measure of griddedness represents a measure of how orthogonally gridded is the geographical area under analysis for urban form.

According to some embodiments, the indicating comprises indicating, based on the determined measure of angular complexity and the determined measure of griddedness, ease of navigation of one or more neighborhoods in the geographical area to a traveler or a potential resident, wherein the one or more neighborhoods are ranked using the determined measure of angular complexity and the determined measure of griddedness.

According to some embodiments, at least one of the determined measure of angular complexity, the determined measure of angular entropy, and the determined measure of griddedness are input into a machine learning model to predict one or more neighborhoods in the geographical area suitable for a real estate company.

According to some aspects, a method is provided for using at least one computer hardware processor to perform obtaining an image of a map relating to a geographical area, identifying, using at least one automated image processing technique, a set of angles associated with a set of edges in the image, determining, based on the set of angles, at least one of a measure of angular complexity, a measure of angular entropy, and a measure of griddedness for the image, and indicating an urban form of the geographical area based on at least one of the determined measure of angular complexity, the determined measure of angular entropy, and the determined measure of griddedness of the image.

According to some aspects, at least one non-transitory computer-readable storage medium is provided for storing processor-executable instructions that, when executed by the at least one computer hardware processor, cause the at least one computer hardware processor to perform obtaining an image of a map relating to a geographical area, identifying, using at least one automated image processing technique, a set of angles associated with a set of edges in the image, determining, based on the set of angles, at least one of a measure of angular complexity, a measure of angular entropy, and a measure of griddedness for the image, and indicating an urban form of the geographical area based on at least one of the determined measure of angular complexity, the determined measure of angular entropy, and the determined measure of griddedness of the image.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

Various non-limiting embodiments of the technology will be described with reference to the following figures. It should be appreciated that the figures are not necessarily drawn to scale.

DETAILED DESCRIPTION

Conventional approaches have relied on intuition or local real estate expertise to effect decisions relying on the urban form of a neighborhood. However, such sources may not be reliable or sufficient indicators of the urban form of a neighborhood.

The inventors have recognized that a system for algorithmically analyzing the urban form of cities and neighborhoods may enable users and systems to better distinguish features relating to the urban form of the cities and neighbors. For example, such a system may distinguish the complex, labyrinthine layout of certain cities and neighborhoods from cities and neighborhoods that are orthogonally gridded. In another example, the system may distinguish sparse rural areas from dense urban centers. In yet another example, the system may give an indication of how easy an area is to navigate using particular modes of transport, e.g., walking, biking, public transportation, etc.

In particular, the described systems and methods provide for obtaining an image of a map relating to a geographical area, identifying, using at least one automated image processing technique, a set of angles associated with a set of edges in the image, determining, based on the set of angles, at least one of a measure of angular complexity, a measure of angular entropy, and a measure of griddedness for the image, and indicating an urban form of the geographical area based on at least one of the determined measure of angular complexity, the determined measure of angular entropy, and the determined measure of griddedness of the image.

In some embodiments, a measure of griddedness for a geographical area may indicate an extent to which the geographical area is gridded. Such a measure may take on different values for geographical areas having different degrees of gridding. For example, the measure of griddedness for a city block (e.g., a high value), with streets arranged as a grid, may be different from the measure of griddedness for a rural area with curve roads (e.g., a low value). In some embodiments, a measure of angular complexity may indicate an extent of a total number of unique angles present in the set of angles determined from the image of the map. For example, the measure of angular complexity for a city block (e.g., a low value), with streets arranged as a grid, may be different from the measure of angular complexity for a rural area with curve roads (e.g., a high value). In some embodiments, a measure of angular entropy may indicate an extent of distribution of unique angles present in the set of angles determined from the image of the map. For example, the measure of angular entropy for a city block (e.g., a low value), with streets arranged as a grid, may be different from the measure of angular entropy for a rural area with curve roads (e.g., a high value). Taking an example with two different sets of angles, while the angular complexity of the set [10, 10, 10, 10, 10, 40] may be equal to the angular complexity of the set [10, 10, 10, 40, 40, 40], these sets may have different angular entropies.

The described systems and methods improve computerized search technology by enabling automated analysis of urban form of cities and neighborhoods. Conventional approaches have relied on non-automated sources, such as intuition or local real estate expertise, to guide decisions relying on the urban form of cities and neighborhoods. The described systems and methods replace sources, such as intuition or local real estate expertise, that could not be automated with automated analysis of urban form of cities and neighborhoods. The described automated urban form analysis produces metrics, such as measure of angular complexity, angular entropy, and griddedness, that may indicate the urban form of the neighborhood in question. Additionally, the metrics produced by the described urban form analysis may power predictive machine learning models for a variety of applications, e.g., for retail, commercial and residential real estate companies. For example, a co-working company, such as WEWORK, BREATHER, KNOTEL, CBRE HANA, etc., may conventionally evaluate new spaces to lease or buy based purely on intuition and local real estate expertise. Metrics from the described urban form analysis, describing various different qualities of the city, may provide a powerful, data-driven automated approach to identifying new opportunities.

The described systems and methods provide a particular solution to the problem of analyzing the urban form of a neighborhood. The described systems and methods provide a particular way for automated analysis of urban form of cities and neighborhoods by obtaining an image of a map relating to a geographical area, identifying, using at least one automated image processing technique, a set of angles associated with a set of edges in the image, determining, based on the set of angles, at least one of a measure of angular complexity, a measure of angular entropy, and a measure of griddedness for the image, and indicating an urban form of the geographical area based on at least one of the determined measure of angular complexity, the determined measure of angular entropy, and the determined measure of griddedness of the image. For example, a traveler may prefer going to a part of a city that is easily navigable and gridded, rather than labyrinthine, particularly if that traveler has never been to the city before or does not understand the language of street signs. The griddedness and angular complexity analysis may be used to algorithmically rank and recommend neighborhoods and even specific hotels based on how easy it is to navigate the surrounding area. Moreover, as described above, the metrics produced by the described urban form analysis may power predictive machine learning models for a variety of applications, e.g., for retail, commercial and residential real estate companies.

Moreover, the described systems and methods may provide for an automated urban form analysis that is globally scalable. Because map data is available across the globe, the automated urban form analysis may be scaled out across the globe and allow for predictions in any country. This may be particularly relevant to rapidly scaling companies with global ambitions, as it is often hugely time-consuming to assemble good real estate teams to do sourcing.

The described systems and methods may be used for several different purposes including, but not limited to, recommending specific hotels or apartments for people looking to move or travel to a given city or neighborhood, guiding commercial and residential real estate development and investment, informing scaling strategy for companies and restaurant groups that require brick and mortar locations, and empowering recommendation for location based services and technologies including mobile phone applications, augmented reality applications, and autonomous vehicles. In one implementation, given an identified geographical area (e.g., as provided by a user via a query), the urban form analysis may be performed and the results returned to the referencing program or user.

Figure 1:
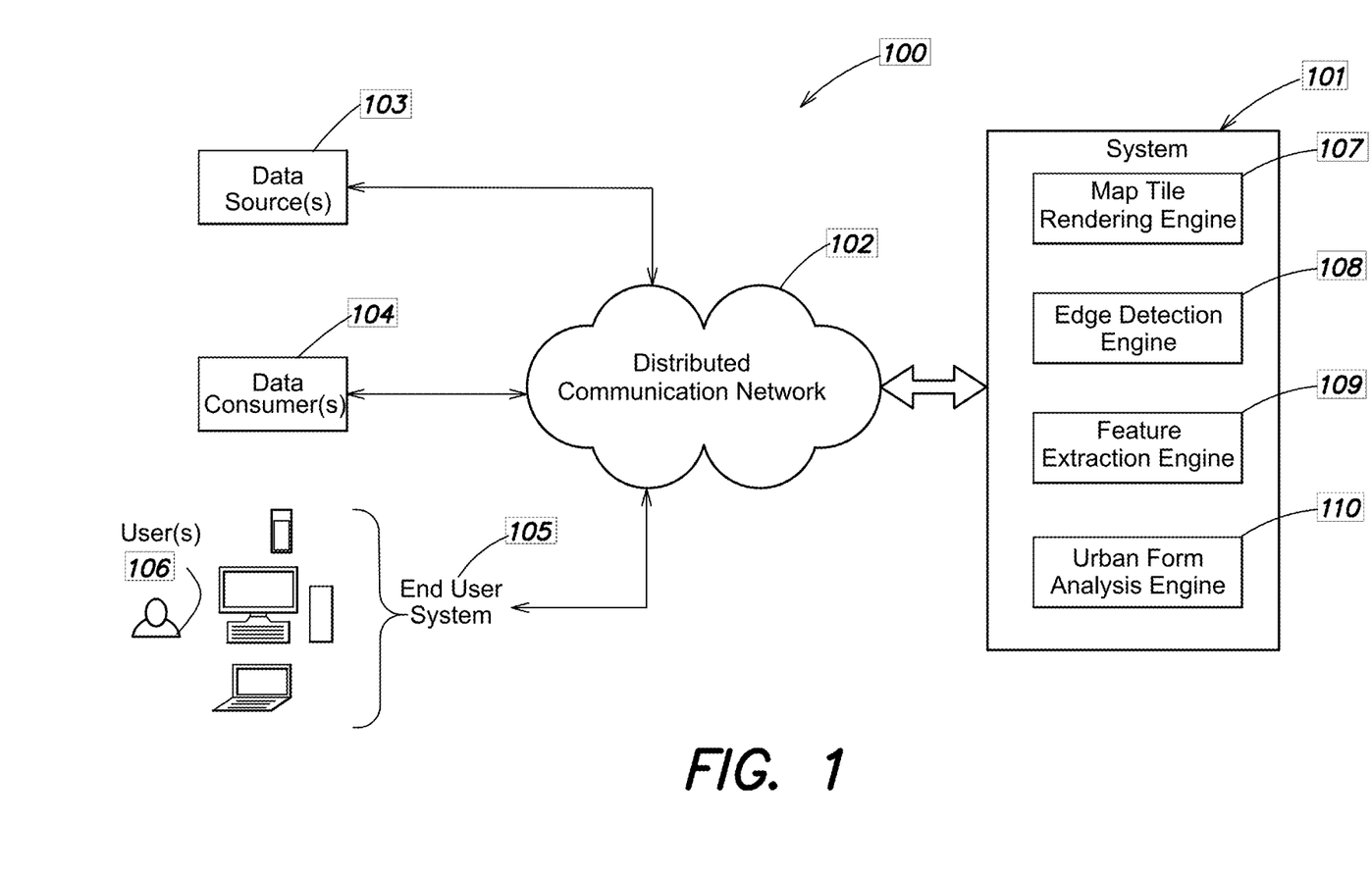
FIG. 1 is a diagram of a distributed system in accordance with some embodiments of the technology described herein.

FIG. 1 shows a processing system 100 that is capable of analyzing urban form for a given geographical area in accordance with some embodiments of the technology described herein. In particular, system 101 is coupled to one or more end user systems 105 through a distributed communication network 102. Further, system 101 may be in communication with one or more data consumers 104 that are adapted to use and/or interpret the resulting urban form analysis. Furthermore, system 101 may interpret one or more data sources 103 for the purposes of obtaining an image of a map relating to a geographical area, identifying, using at least one automated image processing technique, a set of angles associated with a set of edges in the image, determining, based on the set of angles, at least one of a measure of angular complexity, a measure of angular entropy, and a measure of griddedness for the image, and indicating an urban form of the geographical area based on at least one of the determined measure of angular complexity, the determined measure of angular entropy, and the determined measure of griddedness of the image.

System 101 may include one or more elements including a map tile rendering engine 107, edge detection engine 108, feature extraction engine 109, and urban form analysis engine 110. In one embodiment, the map tile rendering engine 107 is capable of rendering one or more map tiles describing urban systems (e.g., street grids, infrastructure, public transportation, etc.) in a certain area or areas. The map tile may be an image of a map of a geographical region or an image of a portion of such a map. The map tile rendering engine 107 may render the one or more map tiles in a uniform format at a uniform zoom level with a uniform set of colors (e.g., black and white) as one or more pixelated images. In one embodiment, edge detection engine 108 is capable of detecting one or more edges in the one or more map tiles. In one embodiment, feature extraction engine 109 is capable of determining one or more angles corresponding to the one or more edges in the at least one map tile. In one embodiment, urban form analysis engine 110 is capable of calculating, based on the one or more angles, at least one of an angular complexity, an angular entropy, and a griddedness metric of the at least one map tile.

Figure 2:
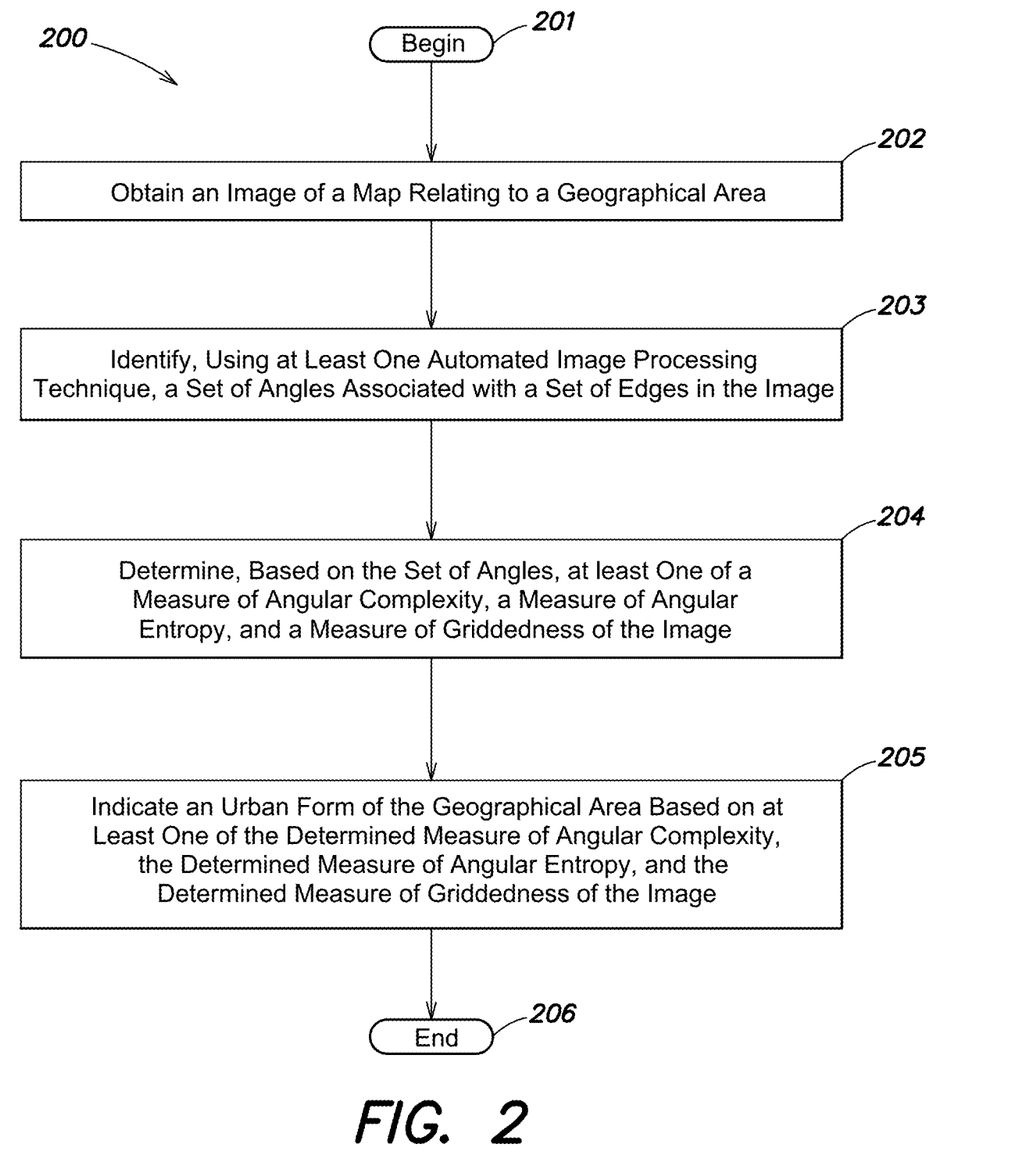
FIG. 2 is a diagram of a process for analyzing urban form of a geographical area in accordance with some embodiments of the technology described herein.

FIG. 2 is a diagram of an example process for analyzing urban form of a geographical area in accordance with some embodiments of the technology described herein. In particular, at block 201, process 200 begins. At block 202, the system obtains an image of a map relating to a geographical area. For example, the system may receive an image of a map for a neighborhood a traveler is planning to visit. At block 203, the system identifies, using at least one automated image processing technique, a set of angles associated with a set of edges in the image. For example, the system may apply an edge detection algorithm, such as the Canny Edge Detection algorithm, to detect the set of edges in the image. The system may further apply a feature extraction algorithm, such as the Hough Transform, to determine the set of angles corresponding to the set of edges. In some embodiments, the system may further round respective numerical values of the set of angles based on a specified rounding threshold. For example, if one street is oriented at a 75.02 degree angle and another is oriented at a 74.98 degree angle, the system may round both to 70 degrees or 75 degrees such that these two streets are considered parallel to one another. The specified rounding threshold in this case may be one degree or 10 degrees or another suitable rounding threshold, depending on the appropriate level of precision desired. At block 204, the system determines, based on the set of angles, at least one of a measure of angular complexity, a measure of angular entropy, and a measure of griddedness for the image. At block 205, the system indicates an urban form of the geographical area based on at least one of the determined measure of angular complexity, the determined measure of angular entropy, and the determined measure of griddedness of the image. For example, a traveler may prefer going to a part of a city that is easily navigable and gridded, rather than labyrinthine, particularly if that traveler has never been to the city before or does not understand the language of street signs. In this example, the system may use the griddedness metric and angular complexity to algorithmically rank and recommend neighborhoods and even specific hotels based on how easy it is to navigate the surrounding area. At block 206, process 200 ends. In some embodiments, in addition or in alternative to the angular analysis described above, the system performs a density analysis on the image of the map relating to the geographical area. For example, the system may analyze the image on a pixel-by-pixel basis to determine the density of pixels representing one or more urban systems (e.g., streets, infrastructure, public transportation, etc.) in the image.

Example Implementation

Figure 4:
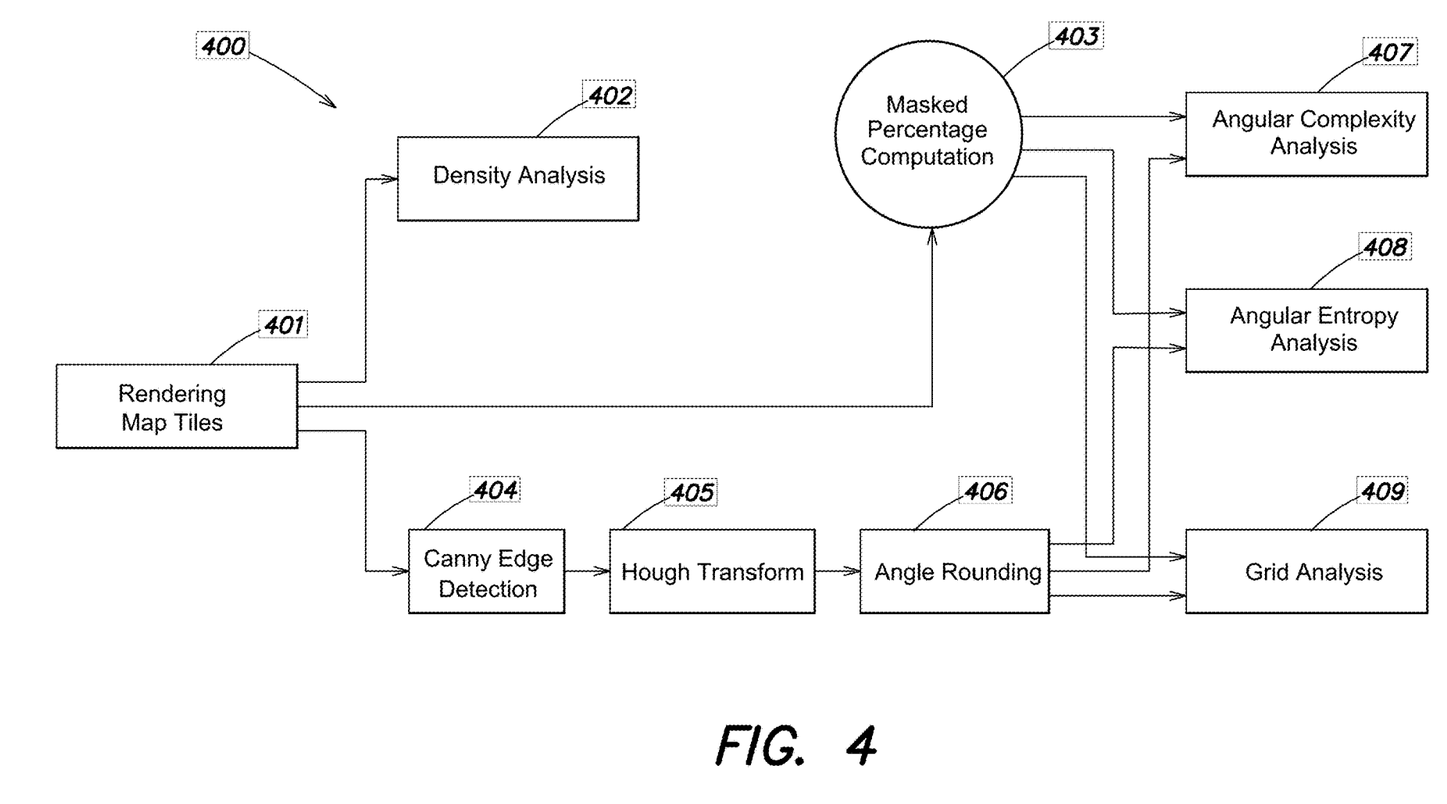
FIG. 4 is a diagram of steps for analyzing urban form of a geographical area in accordance with some embodiments of the technology described herein.

In some embodiments, algorithmically analyzing urban form may include one or more of the following steps. FIG. 4 shows illustrative steps for analyzing urban form according to one or more of steps 401-409 below:
(1) Rendering Map Tiles (401)
(2) Density Analysis (402)
(3) Masked Percentage Computation (403)
(4) Canny Edge Detection (404)
(5) Hough Line Transform (405)
(6) Angle Rounding (406)
(7) Angular Complexity Analysis (407)
(8) Angular Entropy Analysis (408)
(9) Grid Analysis (409)

Figure 3:
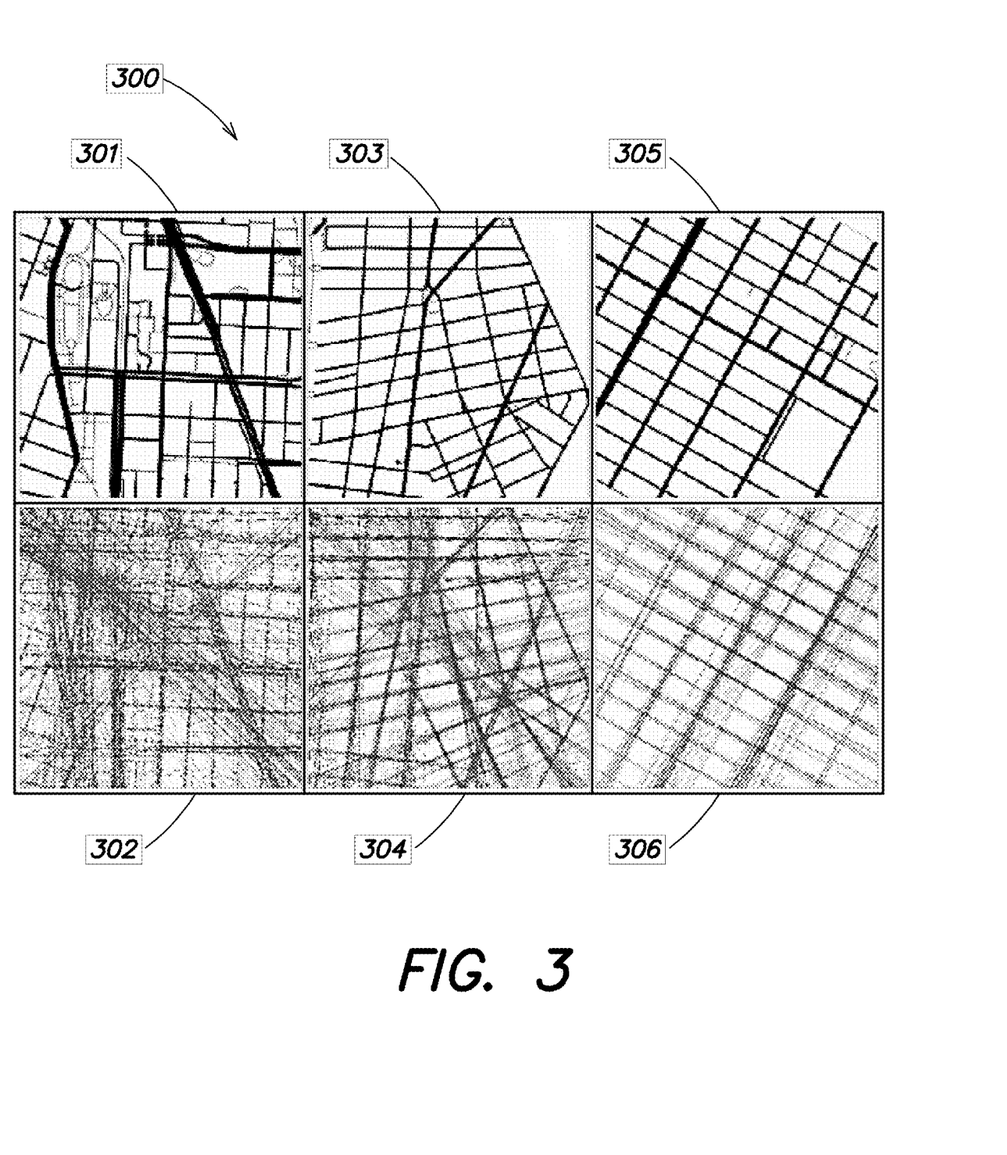
FIG. 3 shows diagrams of exemplary analyses of urban form in accordance with some embodiments of the technology described herein.

In some embodiments, step 1 (401) includes rendering a set of map tiles describing urban systems (e.g., street grids, infrastructure, public transportation, etc.) a certain area or areas in a uniform format at a uniform zoom level with a uniform set of colors (e.g., black and white) as a set of pixelated images. The map tile may be an image of a map of a geographical region or an image of a portion of such a map. FIG. 3 shows map tiles 301, 303, and 305 rendered in black and white as a set of pixelated images.

In some embodiments, step 2 (402) includes directly analyzing on a pixel-by-pixel basis each of the images to determine the overall density of the systems (e.g., streets, infrastructure, public transportation, etc.) that are represented in the tiles.

In some embodiments, step 3 (403) modifies that outputs of steps 7, 8 and 9 (407-409) to ensure that the analyses pertain to a specific region (e.g., neighborhood, city, country, etc.).

In some embodiments, step 4 (404) applies the Canny Edge Detection algorithm to each of the map tiles. Alternatively, step 4 (404) may apply another suitable edge detection algorithm to the map tiles.

In some embodiments, step 5 (405) applies the Hough Transform algorithm to the output of step 4 (404). Alternatively, step 5 (405) may apply another suitable feature extraction algorithm to the output of step 4 (404). FIG. 3 shows map tiles 302, 304, and 306 showing the result of applying steps 4 and 5 (404 and 405) to map tiles 301, 303, and 305.

In some embodiments, step 6 (406) may take the set of angles outputted by step 5 (405) and round the numerical values of the angles to appropriately equate geometries that are roughly the same. The output of step 6 (406) may then be analyzed in a variety of ways.

In some embodiments, step 7 (407) may take the output of step 6 (406) and calculate the total number of unique angles to describe the overall angular complexity of the given map tile.

In some embodiments, step 8 (408) may take the output of step 6 (406) and calculate the entropy of the different angles found in the map tile, in effect producing another independent measure of angular complexity.

In some embodiments, step 9 (409) may take the output of step 6 (406) and calculate how orthogonal the systems rendered in the given map tile are.

Rendering Map Tiles

In some embodiments, map tiles may form the input upon which the urban form analysis is based. The map tile may be an image of a map of a geographical region or an image of a portion of such a map. The final result, i.e., the urban form analysis, of some embodiments of the systems and methods described may include a set of metrics that describe and differentiate a set of geographic areas. The geographic areas in question may be neighborhoods, cities, zip codes, countries or other geographic units. These geographic units may be cartographically described by a set of uniform map tiles that cover the entire area of the unit. Then, each map tile that falls within a given geographic region may be analyzed, and the analysis may be averaged across all tiles that fall within a geographic region to produce a suite of analytical features pertaining to the region. In order to make this suite of analytical metrics relevant across a collection of geographic units (such as all of the cities in America, all of the neighborhoods in New York City, etc.), the input for such analysis may be standardized. To that end, in some embodiments, the following may be consistently applied to all map tiles across all geographic regions:

Format (height and width, measured in pixels),
Zoom level (how zoomed in or out the map is),
Colors (generally black and white, but not necessarily), and/or
Systems Represented (streets, transit lines, infrastructure, etc.)

Figure 5:
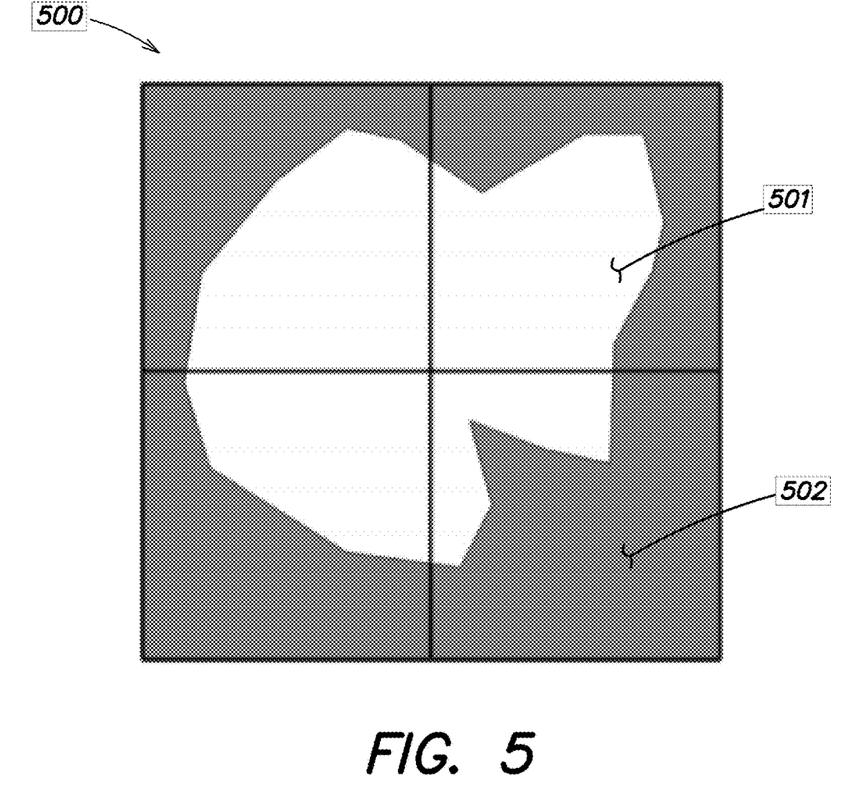
FIG. 5 is a diagram of a mask color applied to a map tile to indicate areas outside of the region in question in accordance with some embodiments of the technology described herein.

The input for this rendering may be via an integration with a publicly available API, such as OPEN STREET MAP, GOOGLE MAPS, MAPBOX, etc. FIG. 5 shows an example region 501 covered by four tiles where the areas 502 outside of the region 501 are rendered in red.

Area Borders

Most geographic regions such as neighborhoods, cities, countries, etc. are not pure rectangles. For this reason, they may not be covered by square map tiles that fall entirely within their borders. In order to address this, in some embodiments, a specified mask color (mask_color) may be used in rendering tiles to indicate areas included in a tile that are outside of the region in question. This mask color may be distinct from any other colors used in rendering tiles. The uniqueness of the color may allow metrics to be computed for only the specific region in question, by computing the percentage of pixels within each tile that are rendered using the mask color, and factoring these percentages into the aggregate metric analysis of a region, or by directly filtering out pixels within tiles that fall outside of the region in question.

Density Analysis

In some embodiments, once uniform map tiles have been rendered for an area or areas, the density of the system represented may be calculated for each tile. For example, if map tiles rendering street grids for a set of areas are produced, each tile may be analyzed to produce an overall street density metric for the given set of areas. Other densities that may be interesting to analyze include public transit density, highway density, park density, commercial zoning density, residential zoning density, and/or bike lane density.

Figure 6:
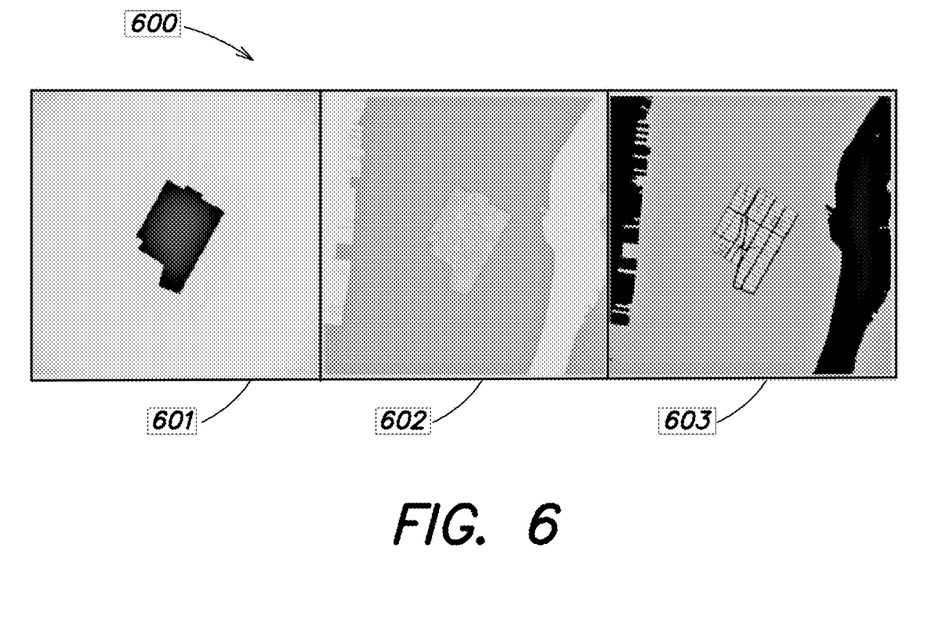
FIG. 6 shows diagrams of mask, commercial, and street grid map tiles in accordance with some embodiments of the technology described herein.

In some embodiments, color may be an important factor for density analysis. A specific color may be chosen for the system in question that is distinguished from all of the other colors rendered in the map tiles, just as mask_color distinguishes portions of map tiles that fall outside of the region in question. The color representing a given system may be referred to as system_color. For example, FIG. 6 shows mask, commercial and street grid tiles for zip code 10003 (601-603) where the chosen color for the system in question is distinguished from all of the other colors rendered in the map tiles.

The system may perform the following algorithm for calculating the system density of an individual tile (map_tile):

Set total_pixels=0
Set system_pixels=0
For each pixel in map_tile:
let pixel_color=color of pixel
If pixel_color !=mask_color
 total_pixels=total_pixels+1
 If pixel_color=system_color:
  system_pixels=system_pixels+1
map_tile_system_density=system_pixels/total_pixels

Masked Percentage Computation

In some embodiments, the masked percentage computation may produce, for each map tile, the percentage of the given tile that falls outside of the region in question. The computation may include:

Iterating through all pixels in a given map tile.
Counting all pixels that are colored with mask_color. This sum may be represented as mask_total.
Dividing mask_total by the total number of pixels in the given tile. So masked_percentage=mask_total/total_pixels.

Canny Edge Detection and Hough Transform

In some embodiments, the Canny Edge Detection algorithm or another suitable edge detection algorithm may be applied to map tiles to reduce the amount of information in a given map tile, and produce a set of edges from the base image of the tile. These edges may then be analyzed using the Hough Transform (or another suitable feature extraction algorithm) to produce, for a given map tile, a set of polar coordinates (rho, theta) that represent the significant (where significance is determined by a tunable threshold) straight lines in a given tile. Of primary interest may be the collection of angles theta produced by the Hough Transform. This collection may be referred to as A_ng={theta} for all theta in {(rho, theta)} produced by the Hough Transform on a given tile.

Angle Rounding

In some embodiments, the angles produced by the Hough Transform may be given at a very high level of precision. However, for the purposes of understanding and analyzing urban form, a high level of precision may be undesirable. For example, if one street is oriented at a 75.02 degree angle and another is oriented at a 74.98 degree angle, these two streets as may be considered as being parallel to one another for most urban applications. For this reason, each angle int A_ng may be rounded to an appropriate level of precision. While this may vary for different applications, in some embodiments, 10 degrees may be considered a useful level of precision. This set of rounded angles may be referred to as R_ang.

Angular Complexity Analysis

In some embodiments, Angular Complexity Analysis takes R_ang and may count the total number of unique angles present in R_ang. For example, if for a given map tile T R_ang of T=[10, 10, 20, 30, 40, 30, 50, 40, 20], then the Angular Complexity of T tile is 5.

To compute the Angular Complexity of a region, the system computes the Angular Complexity of each map tile covering the region, and average across all tiles, factoring in the percentage of each tile that is masked. More specifically:

Let R=The region
Let RT=the set of map tiles covering R

Angular Complexity (R)=Sum [Angular Complexity T*(1−masked percentage of T)] across all T in RT]/Sum [1−masked percentage of T for all T in RT]

Angular Entropy Analysis

In some embodiments, Angular Entropy Analysis may take R_ang and compute the entropy of the distribution of angles present in R_ang, producing another type of complexity analysis for the urban form in question. Thus, while the Angular Complexity of [10, 10, 10, 10, 10, 40]=the Angular Complexity of [10, 10, 10, 40, 40, 40], these distributions may have different Angular Entropies. To compute the Angular Entropy of a region, the system may compute the Angular Entropy of each map tile covering the region, and average across all tiles, factoring in the percentage of each tile that is masked. More specifically:

Let R=The region
Let RT=the set of map tiles covering R

Angular Entropy (R)=Sum [Angular Entropy T*(1−masked percentage of T)] across all T in RT]/Sum [1−masked percentage of T for all T in RT]

Grid Analysis

In some embodiments, Grid Analysis may take R_ang and compute the frequency of orthogonal angles within R_ang, producing a measure of how orthogonally gridded a given region is. This Griddedness metric may be produced as follows:

Let griddedness_list=[ ] (empty list)
Let previous_angle=0
For theta in R_ang:
angle_between =abs(c_angle−prev_angle)
if ((angle_between % 90)==0):
  griddedness_list.append(1.0)
else:
  griddedness_list.append(0.0)
previous_angle=theta
Then compute tile_griddedness=mean(griddedness_list).

To compute the Griddedness of a region, the system may compute the Griddedness of each map tile covering the region, and average across all tiles, factoring in the percentage of each tile that is masked. More specifically:

Let R=The region
Let RT=the set of map tiles covering R

Griddedness (R)=Sum [tile_griddedness*(1−masked_ percentage of T)] across all T in RT]/Sum [1−masked percentage of T for all T in RT]

Powering Machine Learning Models

In some embodiments, one or more of the metrics produced by the described urban form analysis may be used to power predictive machine learning models for a variety of applications, e.g., for retail, commercial, and residential real estate companies. The metrics may provide a uniform feature set for understanding the urban form of any area that can be described by a map, and therefore any area in the world. By overlaying other data sets, such as occupancy rates of coworking spaces, revenue figures for chain restaurants, prices for commodities, or other suitable data sets, one or more urban form related metrics may be used to power predictive models for any of these data sets. For example, one or more urban form related metrics may be used to predict the occupancy rates of a coworking company such as WEWORK, BREATHER, KNOTEL, CBRE HANA, etc., which in turn, may be used to strategize where to locate such spaces, as described below.

In some embodiments, the system receives the occupancy rate, Ocr, for a collection of coworking locations, {Ocr_u}, where u is a spatial unit (zipcode, neighborhood, block, state, city, etc.) that each coworking location is situated within. Note that while these spatial units can be defined in a variety of ways, the same methodology may be applicable to each variation. The system may receive a target spatial unit "t_u" (where the unit is of the same type used for {Ocr_u}) for which to predict the potential occupancy rate of a coworking location would be, were one to be located there. The system may determine one or more of the urban form related metrics for all spatial units {u} in {Ocr_u} as well as t_u. This may result in a set of urban form features {f1, f2, . . . , fn} for all spatial units {u} in {Ocr_u} as well as t_u. Additionally, a target variable (Ocr) for all spatial units {u} in {Ocr_u} may be determined. The system may then generate a prediction for Ocr_t_u (the occupancy rate of the target spatial unit) using one or more predictive models, such as Linear Regression, Ridge Regression, Random Forests, or another suitable model, that are trained on one or more of the metrics and related data determined above.

Example Computer Architecture

Figure 7:
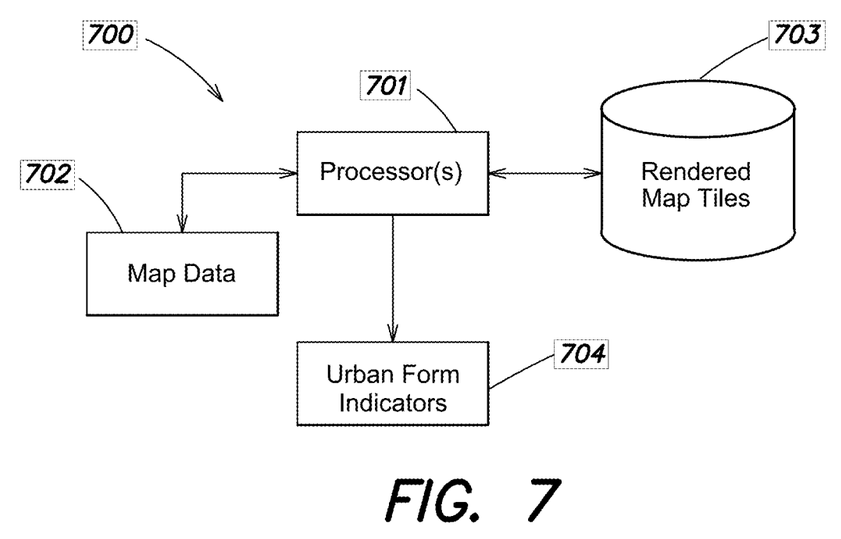
FIG. 7 shows an example implementation for analyzing urban form of a geographical area in accordance with some embodiments of the technology described herein.

One example implementation of the described systems and methods is shown in FIG. 7. In particular, system 700 may include one or more processors 701 that are operable to analyze urban form of a geographical area and generate urban form indicators (e.g., element 704). Such information may be stored within memory or persisted to storage media. In some embodiments, processors 701 may receive map data 702 including at least one map relating to a geographical area. Processors 701 may be configured to execute the described systems and methods to render map tiles 703 from map data 702 and analyze urban form of the geographical area from rendered map tiles 703.

Figure 8:
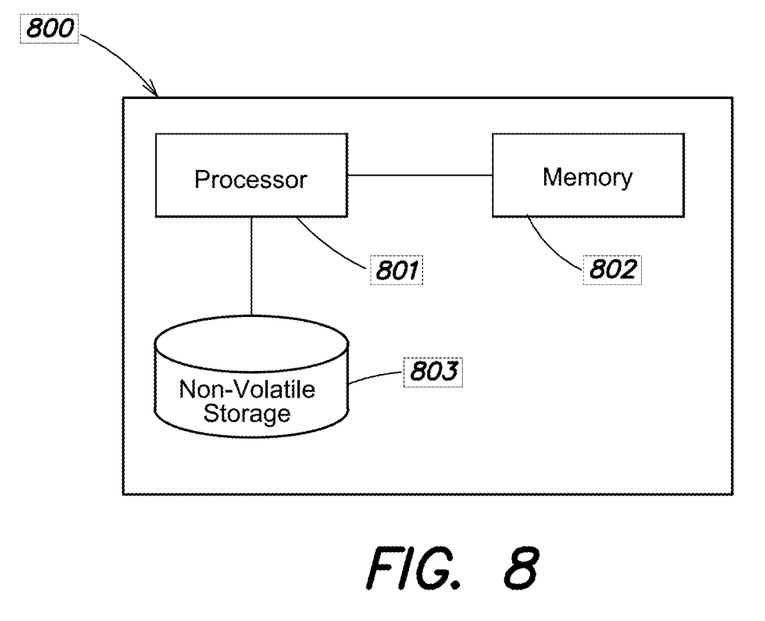
FIG. 8 shows an example computer system for analyzing urban form of a geographical area in accordance with some embodiments of the technology described herein.

An illustrative implementation of a computing device 800 that may be used in connection with any of the embodiments of the disclosure provided herein is shown in FIG. 8. The computing device 800 may include one or more processors 801 and one or more articles of manufacture that comprise non-transitory computer-readable storage media (e.g., memory 802 and one or more non-volatile storage media 803). The processor 801 may control writing data to and reading data from the memory 802 and the non-volatile storage device 803 in any suitable manner. To perform any of the functionality described herein, the processor 801 may execute one or more processor-executable instructions stored in one or more non-transitory computer-readable storage media (e.g., the memory 803), which may serve as non-transitory computer-readable storage media storing processor-executable instructions for execution by the processor 801.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system for analyzing an urban form of a geographical area, comprising:
    at least one computer hardware processor; and
    at least one non-transitory computer-readable storage medium storing processor-executable instructions that, when executed by the at least one computer hardware processor, cause the at least one computer hardware processor to perform:
        obtaining an image of a map relating to a geographical area;
        normalizing the image to produce a normalized image based on at least one of a uniform format, a uniform zoom level, a uniform set of colors, and/or an urban system represented in the map;
        identifying, using at least one automated image processing technique, a set of angles associated with a set of edges in the normalized image;
        determining, based on the set of angles, at least one of a measure of angular complexity, a measure of angular entropy, and/or a measure of griddedness for the normalized image; and
        indicating an urban form of the geographical area based on at least one of the determined measure of angular complexity, the determined measure of angular entropy, and/or the determined measure of griddedness of the normalized image.

2. The system of claim 1, wherein the identifying comprises:
    detecting the set of edges in the normalized image;
    identifying the set of angles using the detected set of edges.

3. The system of claim 2, wherein the detecting is performed using an edge detection algorithm including one or more of a Canny edge detection algorithm, a Deriche edge detection algorithm, a Differential edge detection algorithm, a Sobel edge detection algorithm, a Prewitt edge detection algorithm, and/or a Roberts cross edge detection algorithm.

4. The system of claim 1, wherein the processor-executable instructions further cause the at least one computer hardware processor to perform:
    rounding respective numerical values of the one or more angles based on a specified rounding threshold.

5. The system of claim 1, wherein the processor-executable instructions further cause the at least one computer hardware processor to perform:
    analyzing, on a pixel-by-pixel basis, the normalized image to determine a density of pixels represented in the normalized image.

6. The system of claim 1, wherein the processor-executable instructions further cause the at least one computer hardware processor to perform:
determining a percentage of the normalized image that is outside of the geographical area under analysis for urban form.

7. The system of claim 1, wherein the determining comprises:
determining a total number of unique angles present in the one or more angles to calculate the measure of angular complexity.

8. The system of claim 1, wherein the determining comprises:
determining a distribution of unique angles present in the one or more angles to calculate the measure of angular entropy.

9. The system of claim 1, wherein the determining comprises:
determining a frequency of orthogonal angles present in the one or more angles to calculate the measure of griddedness, wherein the measure of griddedness represents a measure of how orthogonally gridded is the geographical area under analysis for urban form.

10. The system of claim 1, wherein the indicating comprises indicating, based on the determined measure of angular complexity and the determined measure of griddedness, ease of navigation of one or more neighborhoods in the geographical area to a traveler or a potential resident, wherein the one or more neighborhoods are ranked using the determined measure of angular complexity and the determined measure of griddedness.

11. The system of claim 1, wherein at least one of the determined measure of angular complexity, the determined measure of angular entropy, and/or the determined measure of griddedness are input into a machine learning model to predict one or more neighborhoods in the geographical area suitable for a real estate company.

12. A method for analyzing an urban form of a geographical area, comprising:
using at least one computer hardware processor to perform:
obtaining an image of a map relating to a geographical area;
normalizing the image to produce a normalized image based on at least one of a uniform format, a uniform zoom level, a uniform set of colors, and/or an urban system represented in the map;
identifying, using at least one automated image processing technique, a set of angles associated with a set of edges in the normalized image;
determining, based on the set of angles, at least one of a measure of angular complexity, a measure of angular entropy, and/or a measure of griddedness for the normalized image; and
indicating an urban form of the geographical area based on at least one of the determined measure of angular complexity, the determined measure of angular entropy, and/or the determined measure of griddedness of the normalized image.

13. The method of claim 12, wherein the determining comprises:
determining a total number of unique angles present in the one or more angles to calculate the measure of angular complexity.

14. The method of claim 12, wherein the determining comprises:
determining a distribution of unique angles present in the one or more angles to calculate the measure of angular entropy.

15. The method of claim 12, wherein the determining comprises:
determining a frequency of orthogonal angles present in the one or more angles to calculate the measure of griddedness, wherein the measure of griddedness represents a measure of how orthogonally gridded is the geographical area under analysis for urban form.

16. The method of claim 12, wherein the indicating comprises indicating, based on the determined measure of angular complexity and the determined measure of griddedness, ease of navigation of one or more neighborhoods in the geographical area to a traveler or a potential resident, wherein the one or more neighborhoods are ranked using the determined measure of angular complexity and the determined measure of griddedness.

17. At least one non-transitory computer-readable storage medium storing processor-executable instructions that, when executed by at least one computer hardware processor, cause the at least one computer hardware processor to perform:
obtaining an image of a map relating to a geographical area;
normalizing the image to produce a normalized image based on at least one of a uniform format, a uniform zoom level, a uniform set of colors, and/or an urban system represented in the map;
identifying, using at least one automated image processing technique, a set of angles associated with a set of edges in the normalized image;
determining, based on the set of angles, at least one of a measure of angular complexity, a measure of angular entropy, and/or a measure of griddedness for the normalized image; and
indicating an urban form of the geographical area based on at least one of the determined measure of angular complexity, the determined measure of angular entropy, and/or the determined measure of griddedness of the normalized image.

18. The non-transitory computer-readable storage medium of claim 17, wherein the determining comprises:
determining a total number of unique angles present in the one or more angles to calculate the measure of angular complexity.

19. The non-transitory computer-readable storage medium of claim 17, wherein the determining comprises:
determining a distribution of unique angles present in the one or more angles to calculate the measure of angular entropy.

20. The non-transitory computer-readable storage medium of claim 17, wherein the determining comprises:
determining a frequency of orthogonal angles present in the one or more angles to calculate the measure of griddedness, wherein the measure of griddedness represents a measure of how orthogonally gridded is the geographical area under analysis for urban form.

* * * * *